United States Patent [19]
Arakawa et al.

[11] Patent Number: 5,500,675
[45] Date of Patent: Mar. 19, 1996

[54] METHOD OF DRIVING SOLID-STATE IMAGE SENSING DEVICE

[75] Inventors: Kenichi Arakawa, Yokohama; Nobusuke Sasano, Tokyo; Tomoaki Iizuka, Yokohama; Miho Kobayashi, Yokohama; Tetsuo Yamada, Yokohama; Hideki Motoyama, Chigasaki, all of Japan

[73] Assignee: Kabushiki Kaisha Toshiba, Kanagawa, Japan

[21] Appl. No.: 195,176

[22] Filed: Feb. 14, 1994

[30] Foreign Application Priority Data

Feb. 15, 1993 [JP] Japan ................................. 5-047120

[51] Int. Cl.⁶ ............................................. H04N 5/335
[52] U.S. Cl. ........................ 348/319; 348/304; 348/316; 348/318; 250/208.1
[58] Field of Search ................................. 348/318, 203, 348/303, 304, 319, 316, 296; 250/208.1; 257/223; 277/229; H04N 5/335

[56] References Cited

U.S. PATENT DOCUMENTS

| | | | |
|---|---|---|---|
| 5,025,318 | 6/1991 | Nagura | 348/316 |
| 5,057,926 | 10/1991 | Watanabe | 348/296 |
| 5,148,013 | 9/1992 | Yamada | 250/208.1 |
| 5,194,724 | 3/1993 | Sekine | 250/208.1 |

Primary Examiner—Michael T. Razavi
Assistant Examiner—Andrew B. Christensen
Attorney, Agent, or Firm—Finnegan, Henderson, Farabow, Garrett & Dunner

[57] ABSTRACT

In the method of driving a solid-state image sensing device, for each vertical blanking (VBL), the signal charges of a first pixel group composed of photosensitive pixels of odd ordinal numbers counted in the vertical direction of the photosensitive region and the signal charges of a second pixel group composed of photosensitive pixels of even ordinal numbers counted in the same way are reversed in the vertical transfer direction, so that the signal charges of the first and second pixel groups can be outputted from the same charge detecting circuit for each field. Further, unnecessary accumulated charges in the pixel groups in the photosensitive region are cleared off in response to an accumulated charge clear pulse. Further, it is also possible to equalize the photoelectrically converted output voltages of the two charge detecting circuits to each other, by equalizing the charge accumulation periods of the first and second pixel groups to each other on the basis of a third FS pulse (accumulated charge clear pulse).

8 Claims, 5 Drawing Sheets

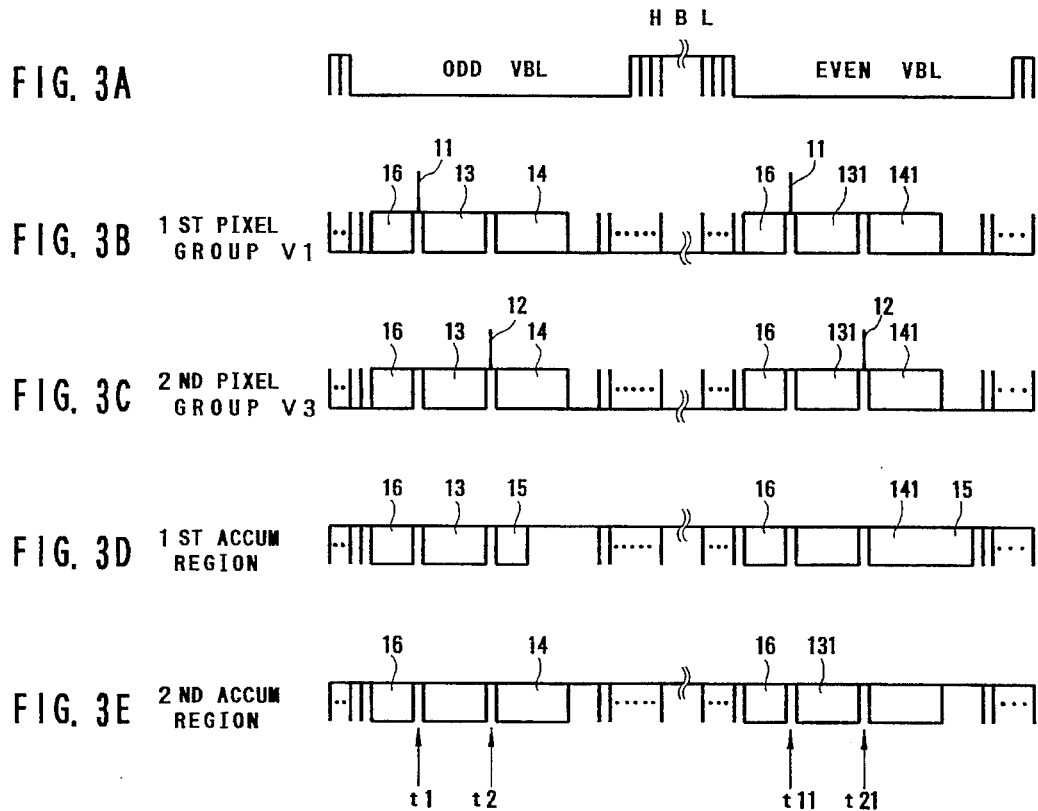
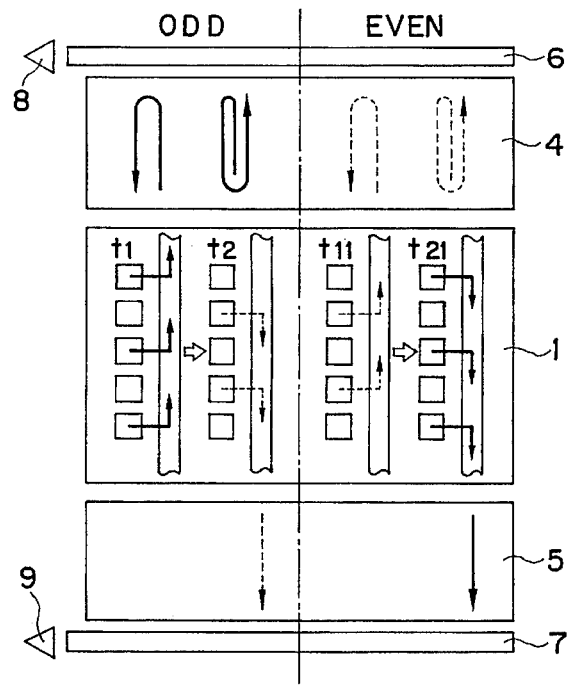
FIG. 4

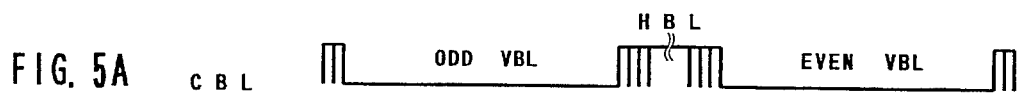
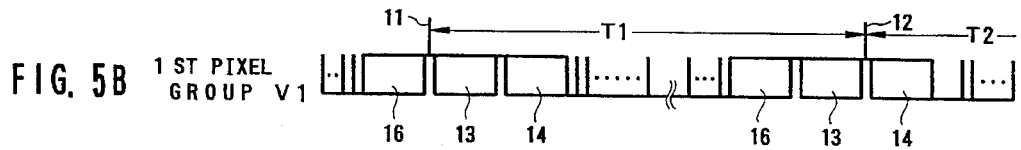
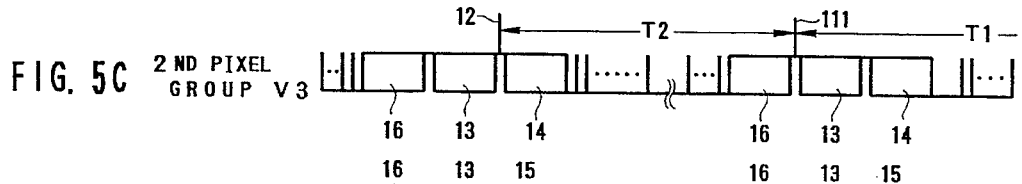
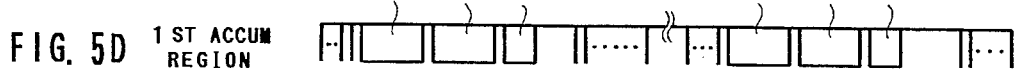
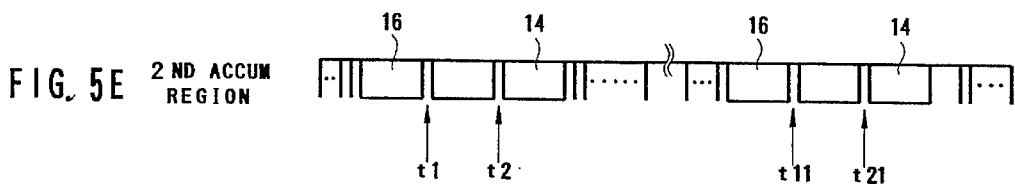
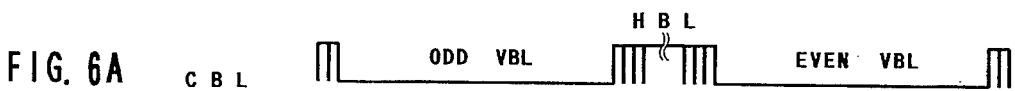
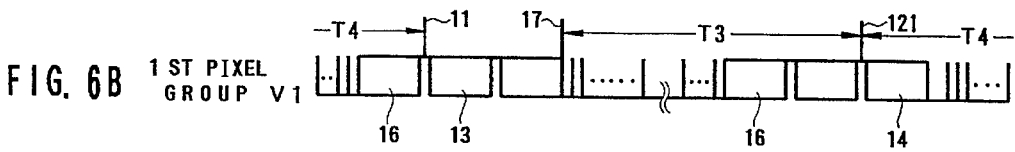
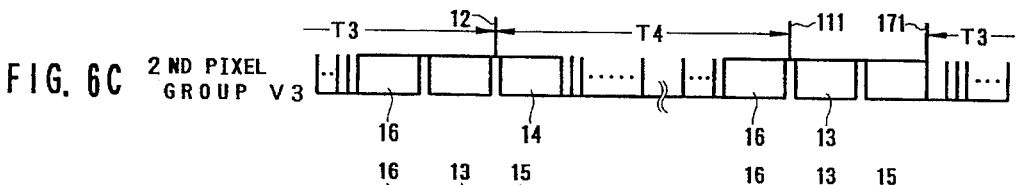
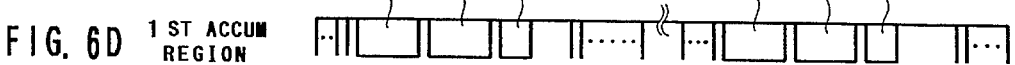
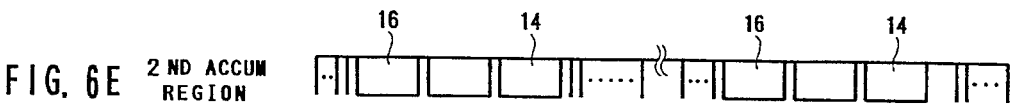

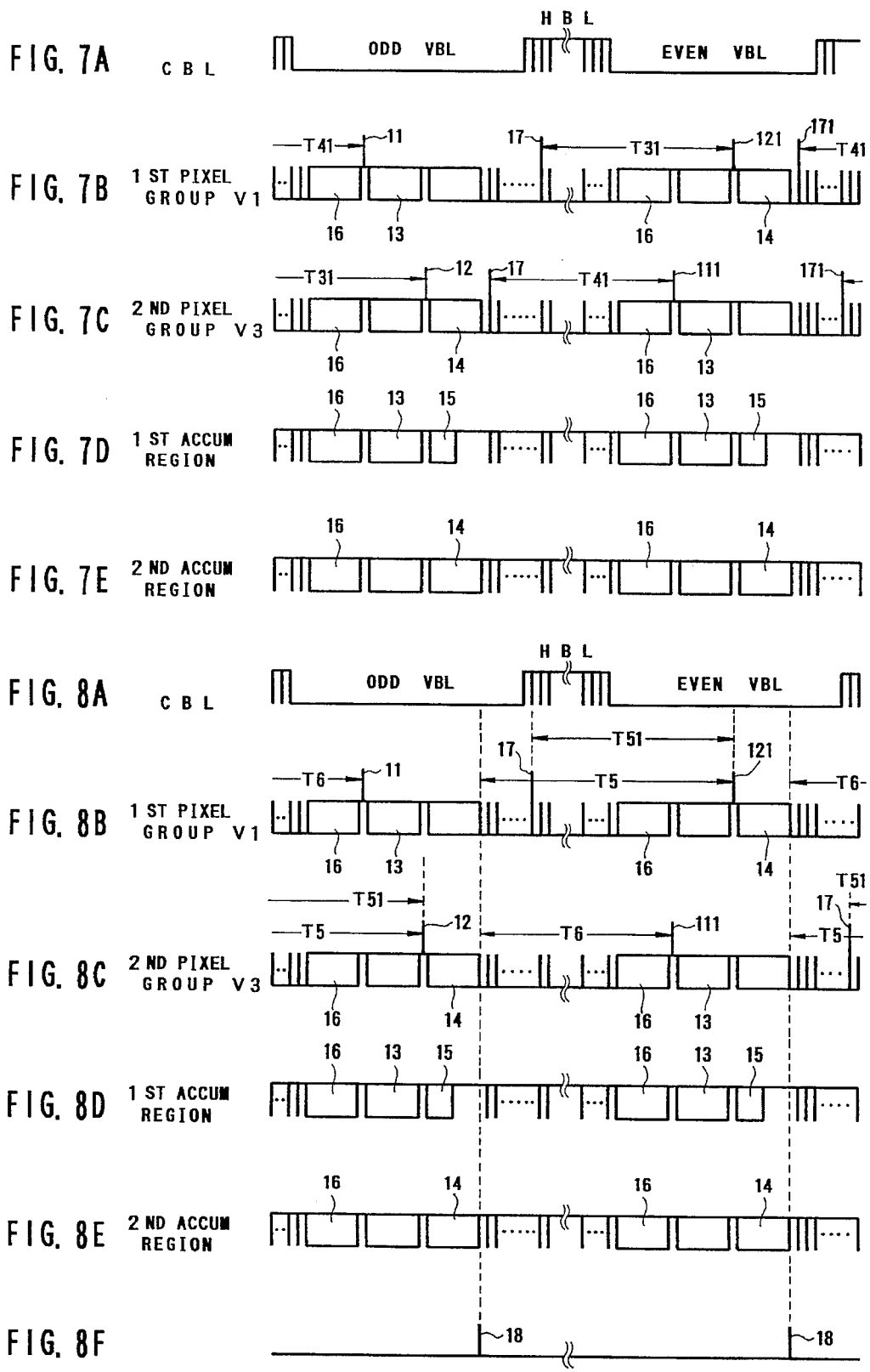

METHOD OF DRIVING SOLID-STATE IMAGE SENSING DEVICE

BACKGROUND OF THE INVENTION

1. Field of the Invention

The present invention relates to a solid-state image sensing device, and more specifically to a method of driving a solid-state image sensing device having field memories adjoining a photosensitive region and being capable of reading two-line signal charges simultaneously.

2. Description of the Prior Art

Among the solid-state image sensing devices including a charge transfer device, a CCD area sensor, for instance, can obtain high resolution video signals. As a result, sensor is widely used as broadcasting CCDs, high picture quality CCDs, electronic still camera CCDs, etc.

In the conventional solid-state image sensing device used as an area sensor which can read two-line image signals simultaneously, a first accumulation region and a second accumulation region are formed on both sides of a photosensitive region, respectively, as field memories. Furthermore, in at least one of the accumulation regions, a cyclic transfer path where a plurality of transfer stages are connected into a loop circuit is provided so that the arrangement sequence of photosensitive elements (pixels) can be changed. The signal charges accumulated in these accumulation regions are transferred along a first horizontal transfer path and a second horizontal transfer path, respectively, and further are detected by a first charge detecting circuit and a second charge detecting circuit, both provided at the transfer ends, respectively. Thus, in general, the signal information (charges) of all the vertical pixels can be obtained within a single field period.

The method of driving the solid-state image sensing device as described above will be described hereinbelow. In the vertical transfer path of the above-mentioned image sensing device, since a single transfer stage is composed of two photosensitive pixels arranged in the vertical direction, the signal charges are read as follows: First, within a vertical blanking period (VBL) of odd field, in response to a first field shift (FS) pulse, the signal charges are read from a first pixel group (composed of photosensitive pixels of odd ordinal numbers counted from above in the vertical direction) to the vertical transfer path. Next, in response to a first field transfer pulse, the read signal charges are further transferred to a first accumulation region formed on one side of the photosensitive region. After that, in response to a second field shift (FS) pulse, the signal charges are read from a second pixel group (composed of photosensitive pixels of even ordinal numbers counted from above in the vertical direction) to the vertical transfer path. Further, in response to a second field transfer pulse, the read signal charges are further transferred to a second accumulation region formed on the other side of the photosensitive region.

In the transfer operation, in the first accumulation region, the signal charges are transferred cyclically by a pulse in such a way that the order of the photosensitive pixels arranged in the vertical direction can be reversed. Further, in synchronism with the horizontal scanning, the signal charges in the first and second accumulation regions are transferred stage by stage to the first and second horizontal transfer paths respectively, and then outputted within an effective horizontal blanking period (HBL) from the first and second charge detecting circuits, respectively, as electric time-series signals. The above-mentioned operation is repeated within the succeeding vertical blanking (VBL) of even field. Further, prior to the first FS pulse, a sweep-off transfer pulse is given to the image sensing device in order to eliminate false signals such as smear or dark current in the vertical transfer paths.

In the method of driving the above-mentioned solid-state image sensing device, since the signal charges read from the photosensitive pixels, arranged in the odd or even ordinal numbers counted from above in the vertical direction of the photosensitive region, are always outputted through different detecting circuits, there exist an imbalance in gain and frequency characteristics between the detecting circuits due to dispersion in the manufacturing process or a difference in circuit design. Thus, a problem arises in that there exists a difference in output between the scanning lines within the same field or between the different fields.

SUMMARY OF THE INVENTION

Accordingly, it is an object of the present invention to provide a method of driving a solid-state image sensing device, having field memories on both sides of a photosensitive region and being capable of reading two-line signal charges simultaneously for each field, which can eliminate a difference in signal output between the lines.

According to the present invention, there is provided a method of driving a solid-state image sensing device, including:

a photosensitive region having photosensitive pixels arranged two-dimensionally in row and column directions, for photoelectrically converting incident light into signal charges and accumulating the converted signal charges temporarily and respectively, and vertical transfer paths formed between columns of the photosensitive pixels, for reading the signal charges and transferring the read signal charges in the column direction, respectively;

a first accumulation region formed at respective first ends of the vertical transfer paths formed in the photosensitive region and having cyclic transfer paths each composed of loop-shaped linked transfer stages;

a second accumulation region having transfer paths formed at respective second ends of the vertical transfer paths;

a first horizontal transfer path formed on the side of the first accumulation region opposite from the photosensitive region, for transferring the signal charges in the row direction, the first horizontal transfer path having a first charge detecting circuit for converting the signal charges into electric signals at one end thereof; and a second horizontal transfer path formed on the side of the second accumulation region opposite from the photosensitive region, for transferring the signal charges in the row direction, the second horizontal transfer path having a second charge detecting circuit for converting the signal charges into electric signals at one end thereof, wherein a transfer operation for transferring the signal charges read from a first pixel group composed of the photosensitive pixels arranged in odd lines in the photosensitive region to one of the first and the second accumulation region and a transfer operation for transferring the signal charges read from a second pixel group composed of the photosensitive pixels arranged in even lines in the photosensitive region to the other of the first and the second accumulation region are effected alternately for each field.

More specifically, the operations include: a first transfer operation and a second transfer operation effected alternately for each field, the first transfer operation comprising the steps of:

transferring the signal charges read from a first pixel group composed of the photosensitive pixels arranged in odd lines in the photosensitive region to the first accumulation region; and transferring the signal charges read from a second pixel group composed of the photosensitive pixels arranged in even lines in the photosensitive region to the second accumulation region; and the second transfer operation comprising the steps of:

transferring the signal charges read from the first pixel group to the second accumulation region; and transferring the signal charges read from the second pixel group to the first accumulation region.

Alternatively, the transfer operations include: a first transfer operation and a second transfer operation effected alternately for each field, the first transfer operation comprising the steps of:

transferring the signal charges read from a first pixel group composed of the photosensitive pixels arranged in odd lines in the photosensitive region to the first accumulation region; and transferring the signal charges read from a second pixel group composed of the photosensitive pixels arranged in even lines in the photosensitive region to the second accumulation region; and the second transfer operation comprising the steps of:

transferring the signal charges read from the second pixel group to the first accumulation region; and transferring the signal charges read from the first pixel group to the second accumulation region.

According to the present invention, for each vertical blanking (VBL), the vertical transfer direction of the signal charges of an odd pixel group in the vertical direction and that of the signal charges of an even pixel group in the vertical direction are reversed, so that the signal charges of the vertical odd pixel group and the signal charges of the vertical even pixel group can be outputted from the same detecting circuits for each field. Here, the signal charges of the vertical odd pixel group imply the signal charges read from a photosensitive pixel group composed of pixels of odd ordinal numbers counted from above in the vertical direction of the photosensitive region, and the signal charges of the vertical even pixel group imply the signal charges read from a photosensitive pixel group composed of pixels of even ordinal numbers counted from above in the vertical direction of the photosensitive region. Further, in this driving method, it is possible to eliminate unnecessary accumulated charges of the photosensitive pixel groups in the photosensitive region on the basis of an accumulated charge clear pulse.

Since the vertical transfer directions of the signal charges of the vertical odd and even pixel groups are reversed, it is possible to output the signal charges of the vertical odd and even pixel groups from the same detecting circuits for each field. Further, it is possible to equalize the accumulation times of the vertical odd and even pixel groups to each other by applying a third FS (accumulated charge clear) pulse, so that the photoelectrically converted output voltages of the two different detecting circuits can be equalized to each other.

BRIEF DESCRIPTION OF THE DRAWINGS

In the attached drawings:

FIGS. 3A to 3E are timing charts showing the operation of the solid-state image sensing device, which is related to the first embodiment according to the present invention;

FIG. 4 is an illustration for assistance in explaining a second embodiment of the method of driving the solid-state image sensing device according to the present invention;

FIGS. 5A to 5E are timing charts showing the operation of the solid-state image sensing device, which is related to the second embodiment according to the present invention;

FIGS. 6A to 6E are timing charts showing the operation of the solid-state image sensing device, which is related to a third embodiment according to the present invention;

FIGS. 7A to 7E are timing charts showing the operation of the solid-state image sensing device, which is related to a fourth embodiment according to the present invention;

FIGS. 8A to 8F are timing charts showing the operation of the solid-state image sensing device, which is related to a fifth embodiment according to the present invention;

DETAILED DESCRIPTION OF THE PREFERRED EMBODIMENTS

Embodiments of the present invention will be described hereinbelow with reference to the attached drawings.

Figure 1:
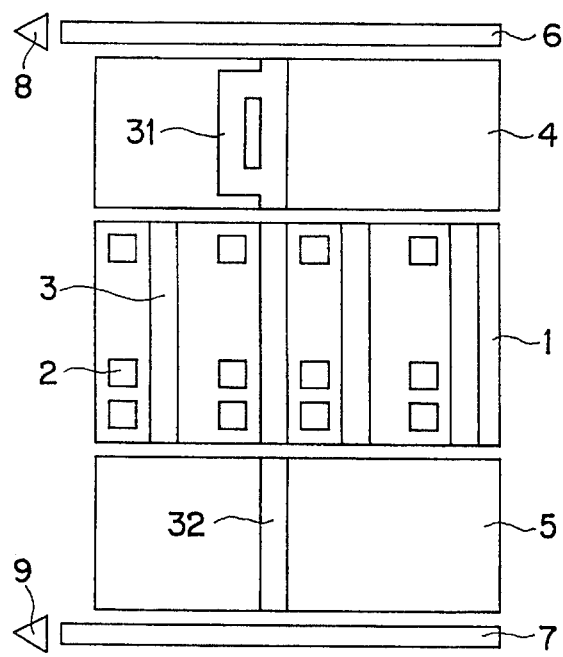
FIG. 1 is a plan view showing the structure of a solid-state image sensing device to which the driving method according to the present invention is applied.

FIG. 1 shows a solid-state image sensing device to which the driving method according to the present invention can be applied.

In a photosensitive region 1 of this solid-state image sensing device, photosensitive pixels 2 for photoelectrically converting incident light into signal charges respectively are arranged two-dimensionally in both the row and column directions. Further, vertical transfer paths 3 are formed between two adjacent vertical photosensitive pixel columns, each of which is composed of a group of photosensitive pixels arranged in vertical direction, respectively. Further, a single transfer stage of the vertical transfer path 3 is composed of two photosensitive pixels arranged adjacent to each other in the vertical direction. Further, a first accumulation region 4 and a second accumulation region 5, both for accumulating signal charges for one field, are formed on both (upper and lower) sides of the photosensitive region 1. In these first and second accumulation regions 4 and 5, a plurality of vertical transfer paths 31 and 32 are arranged, respectively. These vertical transfer paths 31 and 32 are connected to the vertical transfer paths 3 of the photosensitive region 1, respectively.

Further, a first horizontal transfer path 6 and a second horizontal transfer path 7 are formed on both sides of the first accumulation region 4 and the second accumulation region 5, respectively, opposite from the photosensitive region 1. Further, a first charge detecting circuit 8 and a second charge detecting circuit 9 are formed on the ends of the first and second horizontal transfer paths 6 and 7, respectively. Here, the respective vertical transfer path 31 of the first accumulation region 4 is a cyclic transfer path obtained by linking a plurality of transfer stages into a loop circuit so that the vertical arrangement order of the photosensitive pixels 2 can be changed in the photosensitive region 1.

Figure 2:
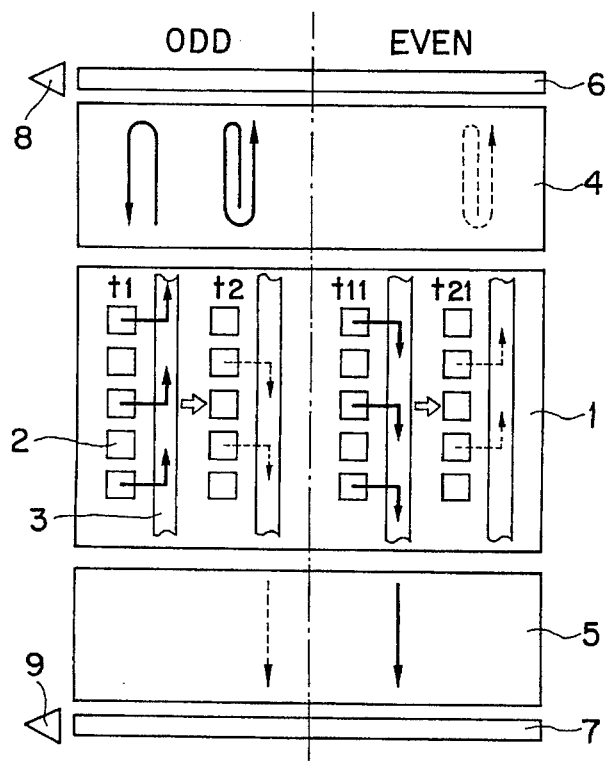
FIG. 2 is an illustration for assistance in explaining a first embodiment of the method of driving the solid-state image sensing device according to the present invention.

FIG. 2 shows a first embodiment of the method of driving the solid-state image sensing device according to the present invention, while FIGS. 3A to 3E show the operation timing charts thereof.

The transfer operation of the solid-state image sensing device related to the present invention is effected on the basis of composite blanking (CBL) signal as shown in FIG. 3A. This CBL signal is a system timing signal synchronous with the TV scanning of this solid-state image sensing device.

In this system timing signal, the vertical blanking (VBL) period and the horizontal blanking (HBL) period are repeated alternately. Within the VBL period, the signal charges are transferred from the photosensitive pixels of the photosensitive region to the vertical transfer paths and further transferred in the vertical direction. As occasion demands, the transfer sequence is changed by the cyclic transfer operation. Further, within the succeeding HBL period, the signal charges are further transferred in the horizontal direction and further outputted to the outside. As described above, it is possible to output all the signal charges to the outside independently within one field period, by repeating the vertical and horizontal transfers by utilization of the blanking periods. Further, when the signal charges are transferred in the vertical and horizontal direction by utilization of the blanking periods, it is possible to prevent control pulses for controlling the transfer operation from being mixed with the outputs of the sensing device in the signal charge reading operation.

FIGS. 3A to 3E show a representative pulse train applied to the respective regions in accordance with the above-mentioned system timing. In the same way as the first and second accumulation regions, the photosensitive region 1 is usually driven by 4-phase pulses V1, V2, V3 and V4. The representative pulses of the first and second pixel groups shown in FIGS. 3B and 3C are V1 and V3, respectively.

First, in the vertical blanking (VBL) of the first ODD field, after the false-signals in the vertical transfer paths are swept off by a sweep-off transfer pulse 16, at a time point t1, in response to a first FS pulse 11, the signal charges are read from a first pixel group composed of (2n−1)th (n=1, 2, . . . ) pixels of odd ordinal numbers counted from above in the vertical direction, and further transferred upward to the first accumulation region 4 in response to a first field transfer pulse 13. Thereafter, at a time t2, in response to a second FS pulse 12, the signal charges are read from a second pixel group composed of (2n)th (n=1, 2, . . . ) pixels of even ordinal numbers counted from above in the vertical direction, and further transferred downward to the second accumulation region 5 in response to a second field transfer pulse 14. During this second transfer period, the signal charges in the first accumulation region 4 are transferred cyclically so that the sequence of the photosensitive pixels can be reversed, and then outputted. Further, under these conditions, the signal charges of the first pixel group are accumulated in the first accumulation region 4, and the signal charges of the second pixel group are accumulated in the second accumulation region 5. Thereafter, on the basis of the line shift operation, the signal charges in the first and second accumulation regions are transferred to the first and second horizontal transfer paths 6 and 7, respectively, and further outputted from the first and second charge detecting circuits 8 and 9 as time-series electric signals, respectively.

Thereafter, within the VBL of the succeeding even field, after the false-signals in the vertical transfer paths 3 have been swept off on the basis of the sweep-off transfer pulse 16, at a time t11 and in response to the first FS pulse 11, the signal charges are read from the first pixel group, and further transferred downward to the second accumulation region 5 in response to the first field transfer pulse 131. Thereafter, at a time t21 and in response to the second FS pulse 12, the signal charges are read from the second pixel group, and further transferred upward to the first accumulation region 4 in response to the second field transfer pulse 141. Further, the signal charges of the second pixel group in the first accumulation region 4 are transferred cyclically so that the sequence of the signal charges is reversed, and then outputted.

Under these conditions, the signal charges of the second pixel group are accumulated in the first accumulation region 4, and the signal charges of the first pixel group are accumulated in the second accumulation region 5. Thereafter, on the basis of the line shift operation, the signal charges in the first and second accumulation regions are transferred to the first and second horizontal transfer paths 6 and 7, respectively, and further outputted from the first and second charge detecting circuits 8 and 9 as time-series electric signals, respectively. Accordingly, the signal charges of the first and second pixel groups are outputted from the first and second charge detecting circuits, respectively for each field. The above-mentioned operation for each field is repeated alternately.

In this embodiment, in the first accumulation region 4 of the even field, since the second field transfer 141 and the cyclic transfer 15 are effected simultaneously, the transfer period is slightly lengthened. To overcome this problem, that is, to complete all the transfer within a limited VBL period, the speed of the sweep-off transfer 16 (which is not directly related to the signal charge transfer) is increased to shorten the sweep-off period. In this embodiment, the sweep-off transfer frequency is determined to be about 1.3 MHz and the field frequency and the cyclic transfer frequency are determined to be about 0.5 MHz, for instance. However, these frequencies are not limited to only these numerical values.

The second embodiment of the present invention will be described hereinbelow with reference to FIG. 4 and FIGS. 5A to 5E. FIG. 4 shows the operation of solid-state image sensing device according to the second embodiment, and FIGS. 5A to 5E are timing charts thereof.

Within the VBL of the odd field, after the false-signals in the vertical transfer paths 3 have been swept off on the basis of the sweep-off transfer pulse 16, at a time t1 and in response to the first FS pulse 11, the signal charges are read from the first pixel group, and further transferred downward to the first accumulation region 4 in response to the first field transfer pulse 13. Thereafter, at a time t2 and in response to the second FS pulse 12, the signal charges are read from the second pixel group, and further transferred upward to the second accumulation region 5 in response to the second field transfer pulse 14. During this period, the signal charges in the first accumulation region 4 are transferred cyclically so that the sequence of the signal charges is reversed, and then outputted.

Under these conditions, the signal charges of the first pixel group are accumulated in the first accumulation region 4, and the signal charges of the second pixel group are accumulated in the second accumulation region 5. Thereafter, on the basis of the line shift operation, the signal charges in the first and second accumulation regions 4 and 5 are transferred to the first and second horizontal transfer paths 6 and 7, respectively, and further outputted from the first and second charge detecting circuits 8 and 9 as time-series electric signals, respectively.

Within the VBL of the succeeding even field, after the false-signals in the vertical transfer paths 3 have been swept off on the basis of the sweep-off transfer pulse 16, at a time t11 and in response to the first FS pulse 111, the signal charges are read from the second pixel group, and further transferred upward to the first accumulation region 4 in response to the first field transfer pulse 13. Thereafter, at a time t21 and in response to the second FS pulse 121, the signal charges are read from the first pixel group, and further transferred downward to the second accumulation region 5 in response to the second field transfer pulse 14. During this period, the signal charges in the first accumulation region 4 are transferred cyclically so that the sequence of the signal charges is reversed, and then outputted.

Under these conditions, the signal charges of the second pixel group are accumulated in the first accumulation region 4, and the signal charges of the first pixel group are accumulated in the second accumulation region 5. Thereafter, on the basis of the line shift operation, the signal charges in the first and second accumulation regions 4 and 5 are transferred to the first and second horizontal transfer paths 6 and 7, respectively,, and further outputted from the first and second charge detecting circuits 8 and 9 as time-series electric signals, respectively in the same way as before. Accordingly, the signal charges of the first and second pixel groups are outputted from the first and second charge detecting circuits, respectively for each field.

In this embodiment, in order to expand the sweep-off transfer period, the signal charges are transferred to the first accumulation region 4 (in which the cyclic transfer is effected) in response to the first field transfer pulse in both the odd and even fields.

A third embodiment will be described hereinbelow with reference to FIGS. 6A to 6E.

In the second embodiment as described with reference to FIGS. 5A to 5E, the signal charges are read from the first and second pixel groups by switching the first and second FS pulses for each field. Therefore, the signal charge accumulation period of the first pixel group is a time period T1 between the first FS pulse and the second FS pulse of the succeeding field, and that of the second pixel group is a time period T1 between the second FS pulse and the first FS pulse of the succeeding field. Further, in the succeeding field, the accumulation period T2 of the first pixel group is T2, and the accumulation period of the second pixel group is T1. In other words, since the charge accumulation periods of both the pixel groups differ from each other for each field, there exists a difference in output voltage between the two charge detecting circuits due to difference in the photoelectric conversion characteristics. Therefore, in this case, after the charge detection, it is necessary to correct the gains of the charge detecting circuits by use of external circuits, thus raising a problem in that the circuit configuration is complicated in the system. For instance, when the frequencies of the first and second field transfer pulses are 900 KHz, the difference between the two accumulation times T1 and T2 is about 580 µs, with the result that a difference in the photoelectric conversion output voltage is about 4% between the two.

To overcome this problem, in this third embodiment, within the VBL of the odd field, after the false-signals in the vertical transfer paths 3 have been swept off on the basis of the sweep-off transfer pulse 16, in response to the first FS pulse 11, the signal charges are read from the first pixel group, and further transferred downward to the first accumulation region in response to the first field transfer pulse 13. Thereafter, in response to the second FS pulse 12, the signal charges are read from the second pixel group, and further transferred upward to the second accumulation region in response to the second field transfer pulse 14. During this period, the signal charges in the first accumulation region 4 are transferred cyclically so that the sequence of the signal charges is reversed, and then outputted.

Under these conditions, the signal charges of the first pixel group are accumulated in the first accumulation region 4, and the signal charges of the second pixel group are accumulated in the second accumulation region 5. Further, after the completion of the second field transfer operation, a third FS pulse (an accumulated charge clear pulse) 17 is applied to the first pixel group to read unnecessary charges photoelectrically converted thereby and accumulated thereat. The unnecessary charges read in response to the accumulated charge clear pulse 17 are also transferred to the second accumulation region 5 in sequence, simultaneously when the signal charges in the first and second accumulation regions 4 and 5 are transferred to the first and second horizontal transfer paths 6 and 7, respectively in the succeeding line shift operation. Further the unnecessary charges are swept off by the sweep-off transfer pulse 16 in the succeeding even field.

In the line shift operation, the signal charges are outputted from the charge detecting circuits 8 and 9, respectively and independently as two-line time-series electric signals.

In the VBL of the succeeding even field, after the false-signals in the vertical transfer paths 3 have been swept off on the basis of the sweep-off transfer pulse 16, in response to the first FS pulse 111, the signal charges are read from the second pixel group, and further transferred upward to the first accumulation region 4 in response to the first field transfer pulse 13. Thereafter, in response to the second FS pulse 121, the signal charges are read from the first pixel group, and further transferred downward to the second accumulation region 5 in response to the second field transfer pulse 14. During this period, the signal charges in the first accumulation region 4 are transferred cyclically so that the sequence of the signal charges is reversed, and then outputted.

Under these conditions, the signal charges of the second pixel group are accumulated in the first accumulation region 4, and the signal charges of the first pixel group are accumulated in the second accumulation region 5. Further, after the completion of the second field transfer, in response to the accumulated charge clear pulse 171, the photoelectric conversion is effected in the second pixel group. The accumulated unnecessary charges are read. The unnecessary charges read in response to the accumulated charge clear pulse 171 are transferred in sequence to the second accumulation region 5, simultaneously when the signal charges of the first and second accumulation regions 4 and 5 are transferred to the first and second horizontal transfer paths 6 and 7, respectively in the succeeding line shift operation. The unnecessary charges are swept off by the sweep-off transfer pulse 16 of the succeeding odd field. The signal charges are outputted from the charge detecting circuits 8 and 9, respectively and independently as two-line time-series electric signals.

As described above, the signal charges of the first and second pixel groups are outputted from the first and second charge detecting circuits, respectively for each field. In this embodiment, however, in the case of the accumulation time of the first pixel group, a time period T3 between the accumulated charge clear pulse and the second FS pulse and a time period T4 between the second FS pulse and the first FS pulse are repeated alternately for each field. In contrast with this, in the case of the accumulation time of the second pixel group, the time period T4 between the second FS pulse and the first FS pulse and the time period T3 between the accumulated charge clear pulse and the second FS pulse are repeated alternately for each field.

As described above, in this embodiment, it is possible to equalize the accumulation period T3 of the first pixel group to the accumulation period T4 of the second pixel group by applying the third FS pulse (the accumulated charge clear pulse) as a dummy pulse, thus it being possible to match the accumulation times of both the first and second pixel groups with each other. Accordingly, the photoelectric conversion voltages outputted by the two charge detecting circuits can be equalized to each other, with the result that it is possible to eliminate the gain correcting circuits for correcting the output voltages of the charge detecting circuits for simplification of the system.

A fourth embodiment of the present invention will be described hereinbelow with reference to FIGS. 7A to 7E.

In this embodiment, the unnecessary accumulated charges of the first and second pixel groups are eliminated by use of the accumulated charge clearance pulse 17. In other words, the accumulated charge clear pulses are applied in such a way that the period T31 between the accumulated charge clear pulse 17 and the second FS pulse applied to the first pixel group is equal to the period T41 between the accumulated charge clear pulse 17 and the first FS pulse applied to the second pixel group, so that it is possible to equalize the accumulation times of the first and second pixel groups with respect to each other. Further, as far as the relationship T31=T41 can be retained, it is possible to adjust the sensitivity by setting the accumulation times to any given values.

A fifth embodiment of the present invention will be described hereinbelow with reference to FIGS. 8A to 8F.

In the fourth embodiment, the unnecessary charges are read to the transfer paths by use of the accumulated charge clear pulse 17. In this fifth embodiment, however, the signal charges are swept off from the photosensitive pixels by applying an accumulated charge clear pulse 18 to an overflow drain (OFD) under the photosensitive pixels (i.e., the semiconductor substrate on which the solid-state image sensing device is formed), so that an accumulation time difference between the first and second FS pulses can be reduced. In this embodiment, in the case of the accumulation time of the first pixel group, a period T5 between the accumulated charge clear pulse 18 and the second FS pulse and a period T6 between the accumulated charge clear pulse 18 and the first FS pulse are repeated for each field. On the other hand, in the case of the accumulation time of the second pixel group, the period T6 between the accumulated charge clear pulse 18 and the first FS pulse and the period T5 between the accumulated charge clear pulse 18 and the second FS pulse are repeated for each field. In this embodiment, the signal charge accumulation time can be set freely.

Further, although it is impossible to reduce the signal difference between the two detecting circuits down to zero, the signal difference can be reduced down to about a half of that of the second embodiment (see T1 and T2 shown in FIGS. 5B and 5C). Further, this signal difference can be further reduced by further increasing the field transfer frequency. In addition, after the accumulated charge clear pulse 18 has been applied, it is possible to shorten the period T5 between the accumulated charge clear pulse 17 and the second FS pulse by applying the accumulated charge clear pulse 17 to any one of the first and second pixel groups. Further, if T5=T6, it is possible to equalize the accumulation times of the first and second pixel groups with respect to each other.

Figure 9:
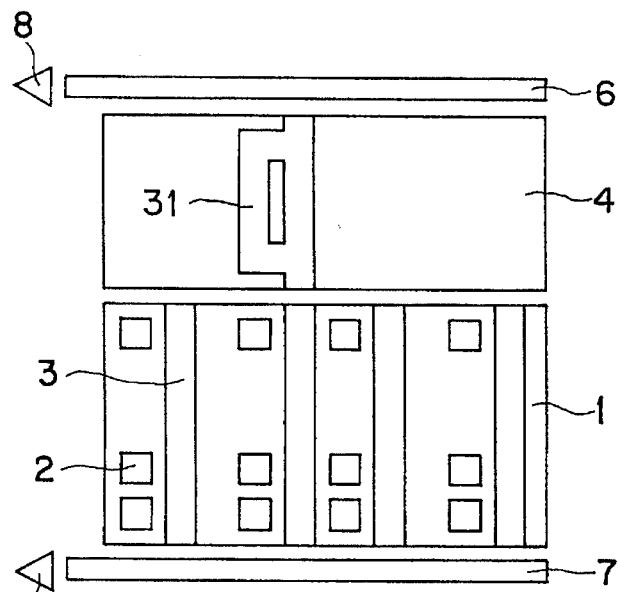
FIG. 9 is a plan view showing the structure of another solid-state image sensing device, to which the driving method according to the present invention is applied.
Figure 10:
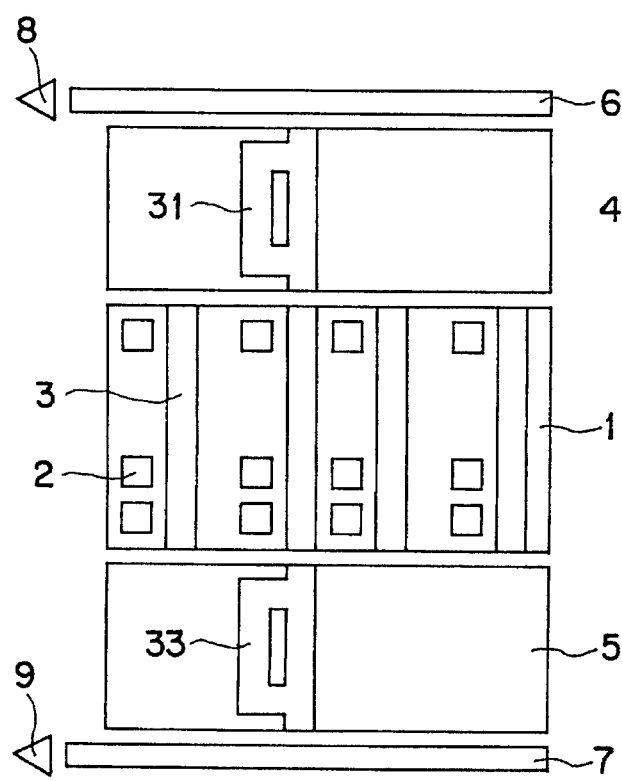
FIG. 10 is a plan view showing the structure of the other solid-state image sensing device, to which the driving method according to the present invention is applied.

The driving method according to the present invention can be applied to the solid-state image sensing devices as shown in FIGS. 9 and 10. In the device shown in FIG. 9, no accumulation region is formed under the photosensitive region 1 but a second horizontal path 7 is formed, being different from the aforementioned embodiments.

In this embodiment as shown in FIG. 9, being different from the image sensing device shown in FIG. 1, it is unnecessary to apply a transfer pulse for transferring the signal charges to the second accumulation region. However, in this embodiment, it is impossible to equalize the accumulation times of the first and second pixel groups.

The feature of the image sensing device shown in FIG. 10 is that th cyclic transfer path is formed in both the first and second accumulation regions 4 and 5. In more detail, the first and second accumulation regions 4 and 5 for accumulating signal charges for one field are provided on both (upper and lower) sides of the photosensitive region 1, respectively. A plurality of vertical transfer paths 31 or 33 are arranged in the first and second accumulation regions 4 and 5, respectively so as to be connected to the vertical transfer paths 3 of the photosensitive region 1, respectively. In the cyclic transfer path, it is possible to transfer the signal charges in the rightward direction or the leftward direction and further in two mutually opposite directions cyclically or alternately. Further, it is also possible to disable the cyclic transfer in the cyclic transfer path. Further, the cyclic transfer can be effected in the clockwise direction or in the counterclockwise direction; that is, it is possible to select the most effective transfer method. In this embodiment, however, it is necessary to omit the line shift pulse for the photosensitive region 1 in order to equalize the accumulation times of the first and second pixel groups with respect to each other.

In the driving method according to the present invention, since the signal charges of the first and second pixel groups can be outputted for each field from the same charge detecting circuit, it is possible to make uniform the two-fields signal charges through the same charge detecting circuit. As a result, when a picture is reproduced by the uniformalized output signals of the charge detecting circuit, it is possible to eliminate the influence due to dispersion in characteristic between the charge detecting circuits, with the result that it is possible to suppress the signal offset between the scanning lines. Further, when the same-field two-line output signals are added after the resolution information has been obtained, it is possible to obtain video signals having a double dynamic range and higher vertical resolution.

In the above-mentioned embodiments, the signal charges are first read from the photosensitive pixels of the odd lines, and then the signal charges are read from the photosensitive pixels of the even lines. However, this order can be of course reversed.

As described above, in the driving method according to the present invention, since the signal charges of the first and second photosensitive pixel groups can be outputted by the same charge detecting circuit for each field, when a picture is reproduced on the basis of the two-field signal charges outputted by the same charge detecting circuit, it is possible to eliminate the influence due to dispersion in characteristic between the charge detecting circuits, so that the signal offset between the scanning lines can be suppressed. In addition, since the accumulation times of the first and second photosensitive pixel groups can be equalized by applying the accumulated charge clear pulse, it is possible to equalize the photoelectrically converted voltages outputted by the two detecting circuits, so that the gain correction of the charge detecting circuit can be eliminated, thus simplifying the system configuration.

What is claimed is:

1. A method of driving a solid-state image sensing device having a photosensitive region, photosensitive pixels arranged in a two-dimensional matrix on the photosensitive region, vertical transfer paths on the photosensitive region for transferring signal charges generated in the photosensitive pixels, first and second accumulation regions flanking either end of the photosensitive region, the first accumulation region having a cyclic transfer path therein, a first horizontal transfer path for transferring signal changes received from the first accumulation region, a second horizontal transfer path for transferring signal charges received from the second accumulation region, a first charge detecting means provided at one end of the first horizontal transfer path, and a second charge detecting means provided at one end of the second horizontal transfer path, the method comprising the steps of:

(1) effecting a first field operation by
  (a) transferring first signal charges generated in an odd-numbered photosensitive pixel column to the first accumulation region,
  (b) transferring second signals charges generated in an even-numbered photosensitive pixel column to the second accumlation region, and
  (c) reverse ordering the first signal charges in the first accumulation region during transfer of the second signal charges to second accumulation region;

(2) effecting a second field operation by
  (a) transferring the first signal charges to the second accumulation region,
  (b) transferring the second signal charges to the first accumulation region, and
  (c) reverse ordering the second signal charges in the first accumulation region during transfer of the first signal charges to the second accumulation region; and (3) alternately repeating step 1 with step 2.

2. The method of driving a solid-state image sensing device according to claim 1 comprising the steps of:

(1) effecting a first accumulated charge clear operation by
  (a) generating a first read pulse,
  (b) in response to the first read pulse, transferring the first signal charges from a first pixel group to the first accumulation region,
  (c) generating a second read pulse,
  (d) in response to the second read pulse, transferring the second signal charges from the second pixel group to the second accumulation region,
  (e) generating an accumulated charge clear pulse, and
  (f) in response to the accumulated charge clear pulse, clearing the charges of at least one of the first and second pixel groups;

(2) effecting a second accumulated charge clear operation by
  (a) generating a first read pulse,
  (b) in response to the first read pulse, transferring the first signal charges from the second pixel group to the first accumulation region,
  (c) generating a second read pulse,
  (d) in response to the second read pulse, transferring the second signal charges from the first pixel group to the second accumulation region,
  (e) generating an accumulated charge clear pulse, and
  (f) in response to the second accumulated charge clear pulse, clearing the accumulated charges of at least one of the first and second pixel groups; and (3) alternately repeating step 1 with step 2, wherein the accumulated charge clear operations are effected alternately for each field operation, and wherein a charge accumulation period between generation of the accumulated charge clear pulse and the first or second read pulse of a succeeding field operation is the same for both first and second pixel groups.

3. The method of driving a solid-state image sensing device according to claim 2, wherein the accumulated charge clear pulse is applied to a semiconductor substrate on which the solid-state image sensing device is formed.

4. The method of driving a solid-state image sensing device according to claim 2, wherein a first accumulated charge clear pulse is applied to a semiconductor substrate on which the solid-state image sensing device is formed and a second accumulated charge clear pulse is applied to either the first or second pixel groups.

5. A method of driving a solid-state image sensing device having a photosensitive region, photosensitive pixels arranged in a two-dimensional matrix on the photosensitive region, vertical transfer paths on the photosensitive region for transferring signal charges generated in the photosensitive pixels, first and second accumulation regions flanking either end of the photosensitive region, the first accumulation region having a cyclic transfer path therein, a first horizontal transfer path for transferring signal charges received from the first accumulation region, a second horizontal transfer path for transferring signal charges received from the second accumulation region, a first charge detecting means provided at one end of the first horizontal transfer path, and a second charge detecting means provided at one end of the second horizontal transfer path, the method comprising the steps of:

(1) effecting a first field operation by
  (a) transferring first signal charges generated in an odd-numbered photosensitive pixel column to the first accumulation region;
  (b) transferring second signal charges generated in an even-numbered photosensitive pixel column to the second accumulation region, and
  (c) reverse ordering the first signal charges in the first accumulation region during transfer of the second signal charges to the second accumulation region;

(2) effecting a second field operation by
  (a) transferring the second signal charges to the first accumulation region, and
  (b) transferring the first signal charges to the second accumulation region, and
  (c) reverse ordering the second signal charges in the first accumulation region during transfer of the first signal charges to the second accumulation region; and (3) alternately repeating step 1 with step 2.

6. The method of driving a solid-state image sensing device according to claim 5, further comprising the steps of:

(1) effecting a first accumulated charge clear operation by
 (a) generating a first read pulse,
 (b) in response to the first read pulse, transferring the first signal charges from a first pixel group to the first accumulation region,
 (c) generating a second read pulse,
 (d) in response to the second read pulse, transferring the second signal charges from a second pixel group to the second accumulation region,
 (e) generating an accumulated charge clear pulse, and
 (f) in response to the accumulated charge clear pulse, (2) effecting a second accumulated charge clear operation by
 (a) generating a first read pulse,
 (b) in response to the first read pulse, transferring the first signal charges from the second pixel group to the first accumulation region,
 (c) generating a second read pulse,
 (d) in response to the second read pulse, transferring the second signal charges from the first pixel group to the second accumulation region,
 (e) generating an accumulation charge clear pulse, and
 (f) in response to the accumulated charge clear pulse, clearing the accumulated charges of at least one of the first and second pixel groups; and (3) alternatively repeating step 1 with step 2, wherein steps 1 and 2 are alternately effected for each of the first and second field operations, and wherein a charge accumulation period between the generation of the accumulated charge clear pulse and the generation of the first or second read pulse of a succeeding field operation is the same for both of the first and second pixel groups.

7. The method of driving a solid-state image sensing device according to claim 6, wherein the accumulated charge clear pulse is applied to a semiconductor substrate on which the solid-state image sensing device is formed.

8. The method of driving a solid-state image sensing device according to claim 6, wherein a first accumulated charge clear pulse is applied to a semiconductor substrate on which the solid-state image sensing device is formed and a second accumulated charge clear pulse is applied to either the first or second pixel groups.

* * * * *